Jan. 30, 1923.
J. H. MAULDING.
WIND DEFLECTOR FOR AUTOMOBILES.
FILED JAN. 3, 1921.
1,443,713.
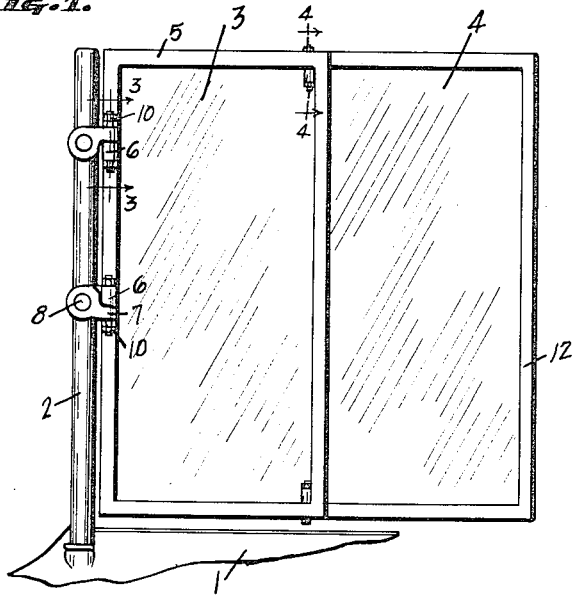
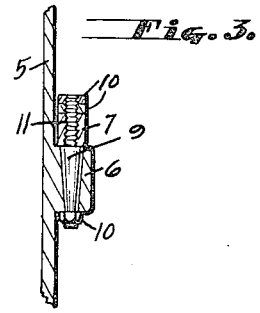
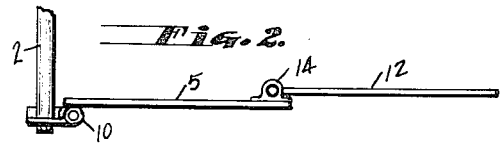
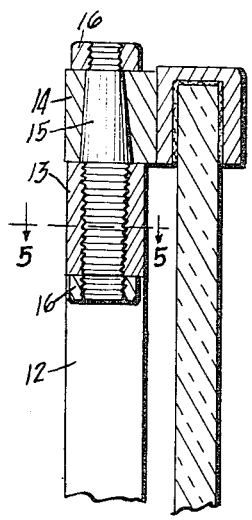
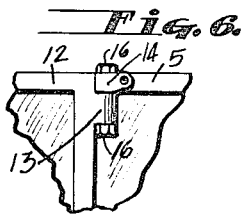
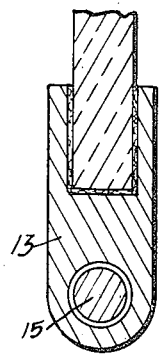
INVENTOR
John H. Maulding.
by Hazard & Miller
ATTYS.

Patented Jan. 30, 1923.

1,443,713

UNITED STATES PATENT OFFICE.

JOHN H. MAULDING, OF LOS ANGELES, CALIFORNIA, ASSIGNOR TO KERT-O-SHIELD MFG. ASSOCIATION, OF SAN ANTONIO, TEXAS.

WIND DEFLECTOR FOR AUTOMOBILES.

Application filed January 3, 1921. Serial No. 434,689.

*To all whom it may concern:*

Be it known that I, JOHN H. MAULDING, a citizen of the United States, residing at Los Angeles, in the county of Los Angeles and State of California, have invented new and useful Improvements in Wind Deflectors for Automobiles, of which the following is a specification.

It is the object of this invention to provide a wind deflector particularly adapted to be mounted at the side of a windshield for a motor vehicle or the like. The present invention contemplates the provision of a wind deflector pivotally adjustable with relation to the windshield and having a second wind deflector which may be moved to a position overlying the first wind deflector or which may be positioned beyond the first wind deflector so as to form additional deflecting means. The invention also provides a pivotal adjustment for the second wind deflector whereby it may be angularly adjusted with relation to the first wind deflector.

The invention will be readily understood from the following description of the accompanying drawings, in which:

Figure 1 is a side elevation showing a portion of an automobile body and its windshield with a wind deflector, constructed in accordance with the present invention, mounted at the side of the windshield.

Fig. 2 is a plan view of the wind deflector.

Figs. 3 and 4 are detail sections on the lines 3—3 and 4—4 of Fig. 1.
Fig. 5 is a detail section on the line 5—5 of Fig. 4.

Fig. 6 is a fragmentary elevation of the wind deflector looking from the opposite direction to that shown in Fig. 1.

In the drawings the automobile body is shown at 1, and the side support for the windshield is shown at 2. A wind deflector 3 is pivotally mounted at one of its side edges to the windshield support 2, and a second deflector 4 is pivotally supported at one of its side edges upon the swinging side edge of the first wind deflector.

As an instance of this arrangement the first deflector 3 is shown mounted in a frame 5 provided with bearing lugs 6 projecting from its inner side edge. These bearing lugs cooperate with axially alined bearing lugs 7 which are, preferably, clamped upon the windshield upright 2 as by set screws 8. The bearing lugs 6 preferably, form tapered bearings, and the bearing lugs 7 are adapted to be clamped in pivotally adjusted position relative thereto by means of bearing pins 9 received through the alined lugs. These bearing pins are tapered to seat in lugs 6 and make threaded engagement with lugs 7. Nuts 10 are received upon the threaded ends 11 of pins 9 projecting beyond lugs 6 and 7. The deflector 3 is thus adapted to be swung to pivotally adjusted positions with relation to the windshield and clamped in its adjusted positions.

The deflector 4 is mounted in a frame 12, and one side edge of said frame is, preferably, provided with laterally extended bearing lugs 13. These bearing lugs are received in axial alinement with lugs 14 mounted upon the frame 5 at the upper and lower ends of its swinging edge. The bearing lugs 14, preferably, form tapered bearings, and bearing pins 15 provided with tapered portions are received through alined lugs 13 and 14 so as to seat in the tapered bores of bearing lugs 14, and make threaded engagement with lugs 13. Nuts 16 are threaded on to the ends of the bearing pins projecting beyond lugs 13 and 14, so as to clamp frame 12 and the deflector 4 in adjusted positions with relation to frame 5 and deflector 3; it being understood that the frame of deflector 4 is pivotally adjustable with relation to deflector 3 by means of the pivotal mounting for said frame.

The bearing lugs 14, preferably, project laterally from deflector 3, so that deflector 4 pivoted in the same way may be swung inwardly alongside of deflector 3, or may be swung outwardly to any desired pivotal adjustment.

It will be noted that the construction as thus described provides for the ready adjustment of deflector 3 with relation to the windshield, and the clamping of said deflector in adjusted positions; and at the same time also enables the deflector 4 to be swung either alongside of the deflector 3, or swung outwardly therefrom to any desired pivotally adjusted position, and furthermore permits of the clamping of deflector 4 in any one of its positions.

Various changes may be made without departing from the spirit of the invention as claimed.

What is claimed is:

1. In combination with a windshield, a side deflector having a frame pivoted to one side thereof, horizontal lugs on the top and bottom of the frame of the side deflector adjacent the outer side thereof and formed with vertical tapered bearings, a second side deflector having a frame the inner vertical side of which is formed with laterally extending lugs inset from the top and bottom of the frame thereof so as to have their outer horizontal faces engage with the inner horizontal faces of the first named lugs; pins threaded at one end and extending through the lateral lugs and having nuts thereon abutting the latter and having tapered parts engaging in the tapered bearings, the opposite ends of the pins being threaded, and nuts on the opposite ends of the pins abutting the lugs of the first named side deflector.

2. In combination with a windshield, a side deflector having a frame pivoted at the side thereof, means to adjustably secure the side deflector in position, a second side deflector having a frame with its inner side arranged to the rear of and in lapping relation to the inner side of the frame of the first named deflector, means to pivot the two deflectors together so as to allow the two to be folded to lie together and with their frames in approximate register and when extended to have a lapping relation, and means to adjustably secure the second named deflector in any position to which it may be moved.

3. In combination with a windshield, a side deflector pivoted at the side thereof, means to adjustably secure the side deflector in position, a second side deflector having its inner side arranged to the rear of and in lapping relation to the first named deflector, means to pivot the two deflectors together so as to allow the second named one to fold rearwardly of the first named one, and to have a lapping relation when extended and means to secure the second named deflector adjustably in any position to which it may be moved.

In testimony whereof I have signed my name to this specification.

JOHN H. MAULDING.